(No Model.)

C. H. RIDSDALE.
LUBRICATOR.

No. 517,300. Patented Mar. 27, 1894.

Witnesses
James F. Duhamel
Horace A. Dodge.

Inventor
Charles H. Ridsdale
by Dodge Sons
Attys

UNITED STATES PATENT OFFICE.

CHARLES HENRY RIDSDALE, OF GUISBROUGH, ENGLAND.

LUBRICATOR.

SPECIFICATION forming part of Letters Patent No. 517,300, dated March 27, 1894.

Application filed April 24, 1893. Serial No. 471,651. (No model.) Patented in England February 19, 1892, No. 3,239.

*To all whom it may concern:*

Be it known that I, CHARLES HENRY RIDSDALE, a subject of the Queen of Great Britain, residing at Hutton, Guisbrough, in the county of York, in the Kingdom of England, have invented certain new and useful Improvements in Lubricators, (for which I have received Letters Patent in England, dated February 19, 1892, No. 3,239,) of which the following is a specification.

This invention has for its object the application of hard solid lubricants, preferably those formed of a mixture of an alkaline earth, stearate and a mineral lubricant such as graphite or steatite with or without common soap paraffine or the like. I make no claim however for the composition of the material in this invention. The use of such lubricants has hitherto been practically confined to the lubrication of neck rolls in rolling mills, and in a few cases where very large shafts are employed and where therefore the brasses or bearings do not completely surround the journal and thus there are large spaces where blocks of solid lubricant can be applied to the journal at those points where the bearing is not continuous.

My invention is best described by aid of the accompanying drawings, in which—

Figure 1:
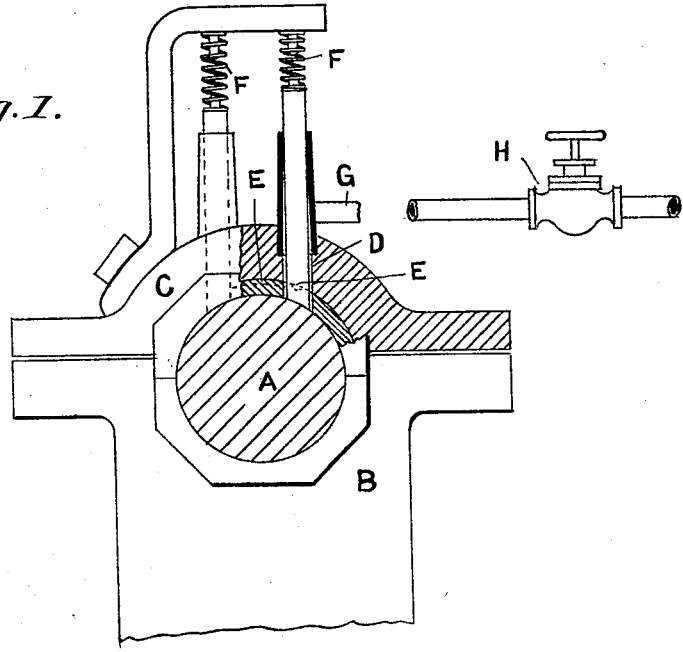
Figure 2:
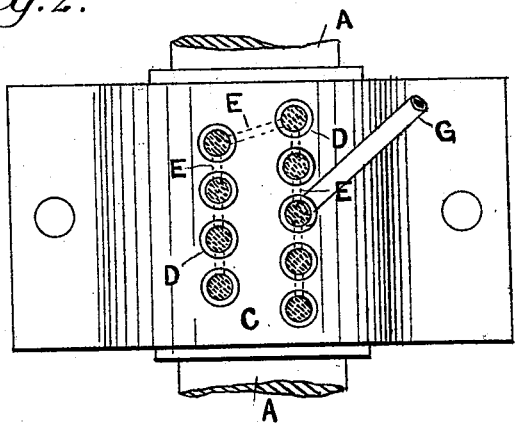

Figure 1 is an elevation and Fig. 2 a plan view.

In the drawings A is the journal, B the lower bearing, C upper bearing, D D a series of vertical or radial holes in the above, E grooves uniting these holes, F springs arranged with suitable abutment to press the lubricant against the journal, G a passage for water, and H a cock for supplying said water. The lubricant is formed of any convenient shape being preferably either long sticks or round pellets.

In order to prevent the lubricant sticking or wedging in the tubes, the latter are preferably made tapering slightly upward, being therefore wider at the bottom; the pieces of lubricant are also preferably coated with shellac or graphite. The water also which passes down into the holes assists in preventing the lubricant sticking to the tubes. The groove E is for the purpose of uniting the various tubes and enabling the lubricant in the case of pellets to spread over the whole length of the bearing and even with a series of sticks it is found that lubricant abraded from these sticks spreads into this groove, the water greatly assists the lubrication. Instead of the spring F a weight can be substituted. The object of using a weight or spring is to force the material against the journal. Where pellets are used instead of sticks a piston is placed in the tube above the pellets for the spring or weight to rest on; the spring if used is provided with any suitable abutment. In place of the weight or spring a screw having a slow continuous motion or operated by hand can be used to screw down the material on to the journal; I prefer however a weight or spring.

I have only shown my invention as applied to the upper surface of a journal, it is obvious however that by means of the aforesaid springs, journals can be lubricated from below or from the side, the lubricant being forced against them.

I claim as my invention—

1. The combination of a journal A; a bearing B C provided with a conical tube; a solid lubricant mounted within but not filling the entire diameter of the tube; and a water supply G H, to convey water to the tube, all substantially as described.

2. The combination in a bearing, of a series of holes D D, having slightly conical tubes of larger internal diameter than the lubricant; a hard solid lubricant mounted in said tubes and pressed against the journal; and a pipe to convey water to the tubes,— whereby a water jacket is formed round the lubricant, substantially as described.

In testimony whereof I have signed my name to this specification in the presence of two subscribing witnesses.

CHARLES HENRY RIDSDALE.

Witnesses:
H. E. WRIGHT,
A. B. MARQUAND.